(12) United States Patent
Koppe

(10) Patent No.: US 10,017,127 B2
(45) Date of Patent: Jul. 10, 2018

(54) CAMERA SUITABLE FOR USE IN A VEHICLE

(75) Inventor: Andreas Koppe, Bad Homburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 908 days.

(21) Appl. No.: 14/005,963

(22) PCT Filed: Mar. 22, 2012

(86) PCT No.: PCT/DE2012/000302
§ 371 (c)(1),
(2), (4) Date: Sep. 18, 2013

(87) PCT Pub. No.: WO2012/130215
PCT Pub. Date: Oct. 4, 2012

(65) Prior Publication Data
US 2014/0009619 A1    Jan. 9, 2014

(30) Foreign Application Priority Data
Mar. 25, 2011    (DE) .................. 10 2011 014 991

(51) Int. Cl.
*B60R 11/04* (2006.01)
*H04N 5/225* (2006.01)
*G02B 27/00* (2006.01)

(52) U.S. Cl.
CPC .......... *B60R 11/04* (2013.01); *G02B 27/0006* (2013.01); *H04N 5/2252* (2013.01)

(58) Field of Classification Search
CPC .............................. B60R 11/04; H04N 5/2252
(Continued)

(56) References Cited

U.S. PATENT DOCUMENTS

| 4,706,654 A | * | 11/1987 | Ogiu | ................. | A61B 1/05 |
| | | | | | 348/E5.026 |
| 5,703,352 A | * | 12/1997 | Snoeren | ............... | H04N 5/2253 |
| | | | | | 250/208.1 |

(Continued)

FOREIGN PATENT DOCUMENTS

| DE | 102004057322 | 6/2006 |
| DE | 202005020282 | 5/2007 |

(Continued)

OTHER PUBLICATIONS

International Search Report and Written Opinion for corresponding PCT Application No. PCT/DE2012/000302.

*Primary Examiner* — Jonathan Messmore
(74) *Attorney, Agent, or Firm* — Honigman Miller Schwartz and Cohn, LLP

(57) ABSTRACT

A camera having a housing, an optical system and an electrical image sensor, particularly for applications in the exterior region of motor vehicles, limits or prevents undesirable influences from moisture penetrating the camera or the housing. This is achieved by virtue of there being channels provided for air circulation in an interior of the optical system on the basis of the heating of air in the housing by operation of the image sensor, with the channels channeling air around lenses of the optical system. The channels may be along an internal wall of a lens frame of the optical system, and the channels may extend from an end portion of the lens frame at or near the image sensor to an internal space within the lens frame and between two adjacent lens elements of the optical system.

20 Claims, 1 Drawing Sheet

(58) Field of Classification Search
 USPC .......................................................... 348/148
 See application file for complete search history.

(56) References Cited

U.S. PATENT DOCUMENTS

| | | | | |
|---|---|---|---|---|
| 7,965,336 B2* | 6/2011 | Bingle | ................... | B60R 11/04 |
| | | | | 348/149 |
| 2004/0169771 A1* | 9/2004 | Washington | ......... | H04N 5/2253 |
| | | | | 348/374 |
| 2004/0239794 A1* | 12/2004 | Saito | ...................... | G02B 7/022 |
| | | | | 348/340 |
| 2005/0276599 A1* | 12/2005 | Kajino | ................. | H04N 5/2252 |
| | | | | 396/419 |
| 2010/0242519 A1* | 9/2010 | Breidenassel | ......... | F21V 29/004 |
| | | | | 62/264 |
| 2011/0122381 A1* | 5/2011 | Hickerson | ........... | B29C 67/0077 |
| | | | | 355/45 |

FOREIGN PATENT DOCUMENTS

| | | |
|---|---|---|
| DE | 102007017238 | 10/2008 |
| DE | 102009019216 | 1/2010 |
| DE | 102009039962 | 4/2010 |
| DE | 102009036653 | 5/2010 |
| DE | 102009019381 | 11/2010 |
| EP | 0212426 | 8/1986 |
| EP | 0741957 | 3/2002 |
| EP | 1608152 | 12/2005 |
| JP | 08009208 | 1/1996 |
| JP | 2008239017 | 10/2008 |
| WO | WO2004047421 | 6/2004 |
| WO | WO2007032672 | 3/2007 |

\* cited by examiner

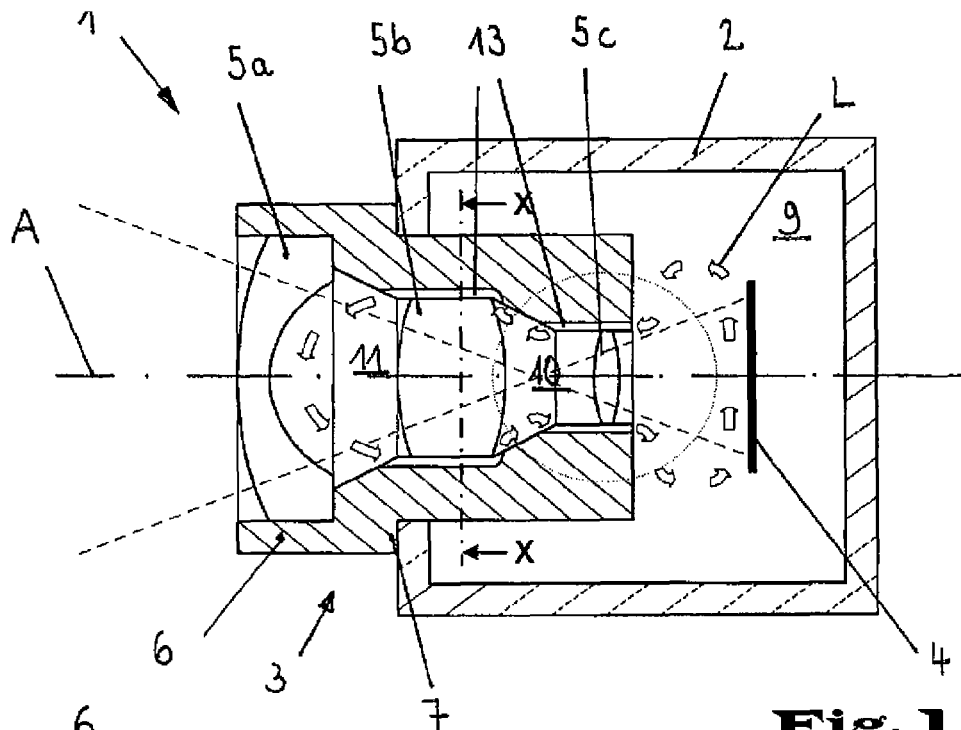
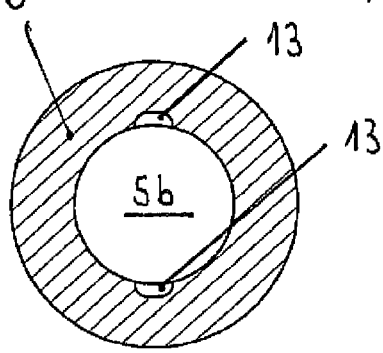
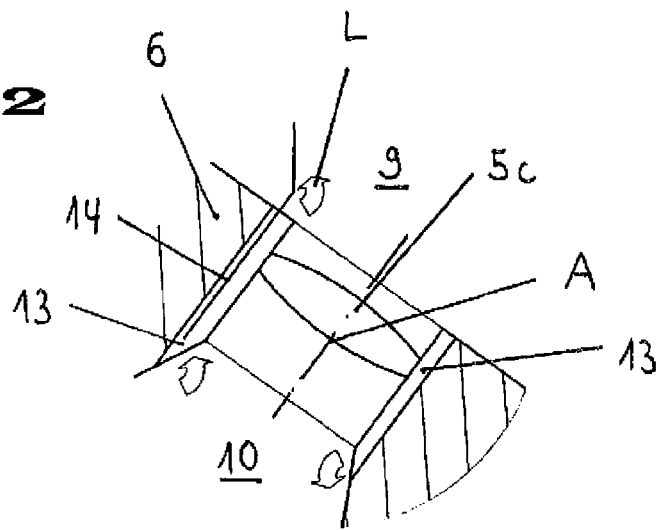
Fig. 1
Fig. 2
Fig. 3

CAMERA SUITABLE FOR USE IN A VEHICLE

CROSS REFERENCE TO RELATED APPLICATIONS

The present application is a 371 national phase filing of PCT Application No. PCT/DE2012/000302, filed Mar. 22, 2012, which claims the filing benefit of German Patent Application No. 102011014991.0.

FIELD OF THE INVENTION

The invention relates to a camera having a housing, an optical system and an electrical image sensor.

BACKGROUND OF THE INVENTION

In the field of motor vehicles, camera systems in particular are used for driver assistance functions as well as for internal and external monitoring of the motor vehicle. For these applications in the internal, and in particular external, region of a motor vehicle, there are stringent requirements owing to external influences such as temperature variations, moisture influences and contamination. Conventionally, camera modules comprising an optical system and an electrical image sensor are formed as hermetically sealed units. The use of a camera module which is not configured in a fully leaktight manner can lead to water of condensation being formed in the optical path, or misting on the lenses of the optical system, and therefore to impairment of the image quality. In order to avoid this, camera modules are known which are provided with a heater and/or an appropriate coating so as to prevent perturbing moisture precipitation on the lenses of the optical system (DE 10 2004 057 322 A1). Furthermore, devices are known in which the camera housing made of plastic is coated with a metal film so as to prevent ingress of moisture.

SUMMARY OF THE INVENTION

It is an object of the present invention to refine a camera having a housing, an optical system and an electrical image sensor, particularly for applications in the external region of motor vehicles, in such a way that undesired influences of moisture entering the camera, or the housing, are prevented.

This object is achieved by a camera having the features specified in claim 1. By forming preferably a number of channels in the optical system, which are provided as means for generating air convection in an internal space of the optical system as a result of the air heating in the housing by the image sensor, it is possible to prevent misting of the lenses of the optical system when moisture enters the camera.

In a preferred embodiment of the concept of the invention, means are provided which project out of the relevant selected channels toward the image sensor for conductive heat transfer. These conductive heat transfer means are preferably configured as an elongate metal body (wire, strip or tube) arranged in the track or as a preferably strip-shaped metallic coating of the track. In particular, the metal strip arranged in the track, or the strip-shaped metallic surface coating in the track, has a thermal connection to a heat sink (metal lug or the like) protruding from the frame. In a particularly preferred configuration of the concept of the invention, the heat sink projects into the region between the image sensor and the optical system. By this configuration as described above, it is also possible to arrange the camera in an oblique installation position arranged in a manner deviating from the horizontal installation position (representation in FIG. 1) and to achieve sufficient air convection to prevent misting of the lenses of the optical system.

According to another advantageous configuration of the concept of the invention it is provided that a section of the outer wall of the housing is formed by a membrane which is impermeable to water but open to vapor diffusion. In this way, transport of the moisture out from the interior of the housing is achieved. Arranging the membrane at a position in the vicinity of the image sensor, the heat given off by which heats the membrane, assists the outward transport of the moisture.

Advantageous configurations and refinements of the present invention are defined in the dependent claims.

BRIEF DESCRIPTION OF THE DRAWINGS

The invention is schematically represented with the aid of exemplary embodiments in the drawings and will be explained in more detail with reference to the drawings, in which:

FIG. 1 shows a camera according to the invention having a housing, an optical system and an electrical image sensor, in a sectional representation in a first installation position, FIG. 2 shows a sectional representation through the optical system along the section X-X indicated in FIG. 1; and FIG. 3 shows a detail view of the detail, indicated in FIG. 1, of a further configuration of the camera in another installation position.

DESCRIPTION OF THE PREFERRED EMBODIMENTS

The camera 1 shown in the sectional representation in FIG. 1, which is used in particular for driver assistance functions and/or external monitoring of a motor vehicle, is installed in the horizontal installation position as shown, preferably in the region of the handle of a tailgate in the rear region of a motor vehicle or in the region of the cooling grille in the front region of a motor vehicle. The longitudinal axis, or optical axis A, of the camera in this case lies horizontally.

The camera 1 essentially comprises a housing 2, an optical system 3 and an electrical image sensor 4. The optical system 3 comprises an arrangement of a plurality of lenses 5a, 5b, 5c, which are arranged at a distance from one another in a tubular frame 6. The exemplary embodiment shown is formed with three lenses 5a, 5b, 5c arranged successively in an optical path. In order to receive the tubular frame 6, the housing 2 is provided with a reception opening. The tubular frame 6 bears tightly via an annular flange section 7 on the housing 2, and projects with a cylindrical section 8 into the interior of the housing. The frame 6 forms a sealed first internal space 9 in the housing 2.

In a plane lying perpendicularly to the optical axis A of the optical system 3, the electrical image sensor 4 is arranged in the internal space 9 of the housing 2. It can furthermore be seen from the drawing that the lenses 5a, 5b, 5c are arranged at a distance from one another in the tubular frame 6 and an internal space 10, 11 is respectively formed between the lenses 5a, 5b, 5c. A connection between these internal spaces 10, and the internal space 9 of the housing 2 is provided by a number of channels 13, which respectively extend from one end of the tubular frame 6 of the optical system 3 to an internal space between two lenses. The channels 13 open into a plurality of internal spaces 10, 11 between pairwise different lenses 5a, 5b, 5c of the optical system, and are preferably applied as a groove or track in an inner wall of the frame 6 of the optical system. Furthermore, the channels are open toward the region of the internal space 9 receiving the image sensor 4. The groove or track in this case respectively lies in a plane with the optical axis (A).

When the camera 1 according to the invention is used in the external region of a motor vehicle, moisture can penetrate into the optical system 3, as explained in the introduction. Owing to the formation of heat given off by the electrical sensor 4 during the operation thereof, a heat flow (convection) occurs in the camera between the internal spaces 9, 10, 11 via the channels 13. This prevents misting of the lenses owing to the moist air that entered in the interior spaces 10, 11. The air circulation in the camera is represented schematically by the arrows L. In one development of the concept of the invention, means for conductive heat transfer in the direction of the air circulation are provided. Said means can be embodied as an elongate metal body arranged in the track or as a strip-shaped metallic coating of the track.

In one exemplary embodiment (not shown), it is furthermore possible to counteract misting when moisture enters by forming a membrane, which is impermeable to water but open to vapor diffusion, on a section of the outer wall of the housing 2. This membrane is preferably arranged at a position in the vicinity of the image sensor 4 in order to be heated by the heat given off by the latter. In this way, moisture is made to emerge from the internal space. In one refinement of the invention, the membrane is a mechanically expanded polytetrafluoroethylene (PTFE) sheet [brand name: Gore-Tex] or a sheet of a polyester and polyether block copolymer [brand name: Sympatex].

FIG. 3 shows, in a detail view indicated in FIG. 1, an enlarged detail of a region of the optical system 3, which adjoins the housing internal space comprising the image sensor 4. In contrast to the embodiment represented in FIG. 1, the camera 1 is in this case arranged in an oblique installation position. The longitudinal axis A of the optical system 3 is arranged at an angle with respect to the horizontal axis. In order to generate sufficient air convection in the internal spaces of the optical system as a result of the air heating in the housing 2 by the image sensor 4 in this installation position of the camera 1 as well, conductive heat transfer means are configured as an elongate metal body preferably arranged in the track 13, or as a preferably strip-shaped metallic coating of the track 13. The elongate metal body may in this case be configured as a wire, strip or tube. It can be seen from the detail view that the metal strip arranged in the track, or the strip-shaped metallic surface coating in the track 13, has a thermal connection to a heat sink 14 protruding from the frame 6. The heat sink 14 is in this case configured as a metal lug and projects into the region between the image sensor 4 and the optical system 3. The heat sink 14 is heated by means of the warm air generated in the internal space 9 owing to heat given off by the image sensor 4. The resulting temperature gradient between the individual channels and internal spaces leads to air circulation and prevents misting of the lenses 5a, 5b, 5c when air enters. The air circulation is schematically indicated by the arrows L.

The invention claimed is:

1. A camera suitable for use in a vehicle, said camera comprising:

a housing, an optical system and an image sensor, wherein the optical system comprises a lens frame accommodating a plurality of lenses, and wherein said plurality of lenses comprises an outermost lens, an innermost lens and at least one intermediate lens disposed between the outermost lens and the innermost lens, and wherein the outermost lens is spaced from an adjacent intermediate lens so that an internal space is present between the outermost lens and the adjacent intermediate lens, and wherein the outermost lens, when the camera is disposed at a vehicle, is exposed at an exterior region of the vehicle, wherein the lens frame is attached at the housing, wherein the housing, with the lens frame attached at the housing, has an interior cavity, wherein the image sensor is disposed within the interior cavity of the housing and, when operated, generates heat that heats the air in the interior cavity of the housing, wherein the lens frame comprises a plurality of channels formed into an inner surface of the lens frame and along a longitudinal axis of the lens frame, wherein the channels terminate in the lens frame without direct ventilation to exterior of the camera, wherein one end of the channels is open at the internal space between the outermost lens and the adjacent intermediate lens, and another end of the channels is open at the interior cavity of the housing, wherein the channels extend to the internal space between the outermost lens and the adjacent intermediate lens such that air circulates from the interior cavity of the housing, along one of the channels, through the internal space between the outermost lens and the adjacent intermediate lens, along another of the channels and back to the interior cavity of the housing, and wherein the channels provide for heated air circulation between the interior cavity of the housing and the internal space as a result of the heating of air in the interior cavity of the housing by the image sensor during operation of the image sensor, and wherein the plurality of channels circulates heated air between the outermost lens and the adjacent intermediate lens.

2. The camera as claimed in claim 1, wherein the channels are arranged opposite a cylindrical passageway in the lens frame.

3. The camera as claimed in claim 2, wherein the channels extend from one end of the lens frame of the optical system to the internal space between the outermost lens and the adjacent intermediate lens.

4. The camera as claimed in claim 3, wherein the channels open into a plurality of internal spaces between pairwise different lenses of the optical system.

5. The camera as claimed in claim 4, wherein the channels in the inner surface of the lens frame lie in a plane with an optical axis of the lenses.

6. The camera as claimed in claim 1, wherein thermally conductive heat transfer elements for increasing the conductive heat transfer in a flow direction are arranged in and at least partially along at least one of the channels.

7. The camera as claimed in claim 6, wherein the channels equipped with the thermally conductive heat transfer elements are open toward the image sensor.

8. The camera as claimed in claim 7, wherein the thermally conductive heat transfer elements project out of the relevant selected channels toward the image sensor.

9. The camera as claimed in claim 8, wherein the thermally conductive heat transfer elements comprise one of (i)

an elongate metal body arranged in the respective channel as a wire, a strip, or a tube, and (ii) a strip-shaped metallic coating of the respective channel.

10. The camera as claimed in claim 9, wherein the thermally conductive heat transfer elements have a thermal connection to a heat sink protruding from the lens frame.

11. The camera as claimed in claim 10, wherein the heat sink projects into the region between the image sensor and the optical system.

12. The camera as claimed in claim 1, wherein a section of the outer wall of the housing includes a membrane which is impermeable to water but open to vapor diffusion.

13. The camera as claimed in claim 12, wherein the membrane is arranged at a position in the vicinity of the image sensor in order to be heated by the heat given off by the image sensor.

14. The camera as claimed in claim 13, wherein the membrane comprises one of (i) a mechanically expanded polytetrafluoroethylene (PTFE) sheet (ii) a sheet of a polyester and polyether block copolymer.

15. A camera suitable for use in a vehicle, said camera comprising:
a housing, an optical system and an image sensor,
wherein the optical system comprises an arrangement of at least two lens elements in a lens frame, and wherein said at least two lens elements comprises an outermost lens element and an inner adjacent lens element, and wherein the outermost lens element is spaced from the inner adjacent lens element so that an internal space is present between the outermost lens element and the inner adjacent lens element, and wherein the outermost lens, when the camera is disposed at a vehicle, is exposed at an exterior region of the vehicle,
wherein the lens frame is attached at the housing,
wherein the housing, with the lens frame attached at the housing, has an interior cavity,
wherein the image sensor is disposed within the interior cavity of the housing,
wherein the lens elements are aligned with the image sensor when the lens frame is attached at the housing,
wherein the optical system includes a plurality of channels established along and partially in opposite regions of an internal wall of the lens frame and along a longitudinal axis of the lens frame,
wherein the channels terminate in the lens frame without direct ventilation to exterior of the camera, and wherein one end of each of the channels is open at the internal space between the outermost lens element and the inner adjacent lens element, and wherein the other end of each of the channels is open at the interior cavity of the housing,
wherein the channels extend from an end portion of the lens frame at or near the image sensor to the internal space within the lens frame and between the outermost lens element and the inner adjacent lens element, and wherein heated air that is heated by operation of the image sensor is circulated from the interior cavity of the housing, along one of the channels, through the internal space between the outermost lens element and the inner adjacent lens element, along another of the channels and back to the interior cavity of the housing.

16. The camera as claimed in claim 15, wherein the at least two lens elements comprise at least three lens elements, and wherein the channels open into a plurality of internal spaces between pairwise lens elements of the optical system.

17. The camera as claimed in claim 16, wherein the plurality of channels comprise two channels that are disposed at opposite sides of the inner wall of the lens frame of the optical system and at least along portions of the inner wall at which the lens elements are disposed.

18. The camera as claimed in claim 15, comprising at least one of (i) an elongate metal body arranged in the channels and (ii) a strip-shaped metallic coating of the channels.

19. A camera suitable for use in a vehicle, said camera comprising:
a housing, an optical system and an image sensor,
wherein the optical system comprises an arrangement of at least three lens elements in a lens frame, wherein said at least three lens elements comprises an outermost lens element, an innermost lens element and at least one intermediate lens element disposed between the outermost lens element and the innermost lens element, and wherein the lens elements are spaced from a respective adjacent lens element so that an internal space is present between pairwise lens elements of the optical system, and wherein the outermost lens, when the camera is disposed at a vehicle, is exposed at an exterior region of the vehicle,
wherein the lens frame is attached at the housing,
wherein the housing, with the lens frame attached at the housing, has an internal space,
wherein the image sensor is disposed within the internal space of the housing,
wherein the optical system includes a plurality of channels established at an inner wall of the lens frame and at least along portions of the inner wall at which the lens elements are disposed,
wherein the plurality of channels comprise a first channel and a second channel formed into and along opposite sides of the inner wall at the portions of the inner wall at which the lens elements are disposed,
wherein the first channel comprises a first portion that opens into the internal space at the imager sensor and a first internal space between first pairwise lens elements of the optical system, and wherein the first channel comprises a second channel portion that opens into the first internal space and a second internal space between a second pairwise lens elements of the optical system,
wherein the second channel comprises a first portion that opens into the internal space at the imager sensor and a first internal space between the first pairwise lens elements of the optical system, and wherein the second channel comprises a second channel portion that opens into the first internal space and a second internal space between a second pairwise lens elements of the optical system, and
wherein air in the internal space at the image sensor is heated during operation of the image sensor and circulates from the internal space at the image sensor through the first channel, through the internal spaces between pairwise lens elements, through the second channel and back to the internal space at the image sensor.

20. The camera as claimed in claim 19, wherein the lens frame comprises at least one of (i) an elongate metal body arranged in at least one of the channels and (ii) a strip-shaped metallic coating established in at least one of the channels.

* * * * *

UNITED STATES PATENT AND TRADEMARK OFFICE
CERTIFICATE OF CORRECTION

PATENT NO. : 10,017,127 B2
APPLICATION NO. : 14/005963
DATED : July 10, 2018
INVENTOR(S) : Andreas Koppe Page 1 of 1

It is certified that error appears in the above-identified patent and that said Letters Patent is hereby corrected as shown below:

In the Specification

<u>Column 2</u>
Line 66, "10, and" should be --10, 11 and--

Signed and Sealed this
Twenty-third Day of October, 2018

Andrei Iancu
*Director of the United States Patent and Trademark Office*